United States Patent [19]

Clegg

[11] Patent Number: 5,390,494
[45] Date of Patent: Feb. 21, 1995

[54] PIPE ASSEMBLY FOR EFFICIENT LIGHT-OFF OF CATALYTIC CONVERTER

[75] Inventor: Michael W. Clegg, Toledo, Ohio

[73] Assignee: AP Parts Manufacturing Company, Toledo, Ohio

[21] Appl. No.: 53,612

[22] Filed: Apr. 27, 1993

[51] Int. Cl.⁶ .............................................. F01N 7/14
[52] U.S. Cl. ........................................ 60/299; 60/272; 29/890.08; 138/121
[58] Field of Search .............. 60/272, 299, 322; 138/112, 114, 121, 137; 29/890.08

[56] References Cited

U.S. PATENT DOCUMENTS

| | | | |
|---|---|---|---|
| 2,913,009 | 11/1959 | Kuthe . | |
| 3,028,289 | 4/1962 | Roberts et al. . | |
| 3,133,612 | 5/1964 | Sailler . | |
| 3,404,445 | 10/1968 | Crouse . | |
| 3,730,229 | 5/1973 | D'Onofrio . | |
| 3,847,184 | 11/1974 | God . | |
| 4,022,019 | 5/1977 | Garcea | 60/323 |
| 4,117,201 | 9/1978 | Keifert . | |
| 4,261,671 | 4/1981 | Langner . | |
| 4,345,430 | 8/1982 | Pallo | 60/299 |
| 4,754,781 | 7/1988 | Jan de Putter . | |
| 4,793,384 | 12/1988 | Lalikos | 138/121 |
| 4,819,970 | 4/1989 | Umehara . | |
| 4,854,416 | 8/1989 | Lalikos | 138/121 |
| 4,953,632 | 9/1990 | Sakaya | 138/121 |
| 4,966,202 | 10/1990 | Bryan et al. . | |
| 4,970,351 | 11/1990 | Kirlin . | |
| 4,984,605 | 1/1991 | Schippl . | |
| 5,069,253 | 12/1991 | Hadley . | |
| 5,163,289 | 11/1992 | Bainbridge | 60/299 |

*Primary Examiner*—Douglas Hart
*Attorney, Agent, or Firm*—Anthony J. Casella; Gerald E. Hespos

[57] ABSTRACT

An exhaust pipe assembly is provided for achieving a quick light-off of a catalytic converter. Exhaust pipe assembly comprises circuitously bent inner and outer pipes disposed in generally concentric relationship to one another. The inner pipe is formed from a very thin metal to provide a low thermal mass and a correspondingly low heat dissipation therefrom. The outer pipe is thicker to provide structural support, and defines an air insulation barrier around the inner pipe to further reduce heat dissipation. The inner pipe is corrugated at selected locations that will correspond to bends in the circuitous exhaust pipe assembly. The thin-walled locally corrugated inner pipe is then inserted into the outer pipe, and the assembly is bent into the required configuration. The corrugations support the inner and outer pipe relative to one another during the bending process and during use. The bent pipe assembly then is connected to the catalytic converter for subsequent mounting to vehicle engine.

25 Claims, 2 Drawing Sheets

U.S. Patent     Feb. 21, 1995     Sheet 1 of 2     5,390,494
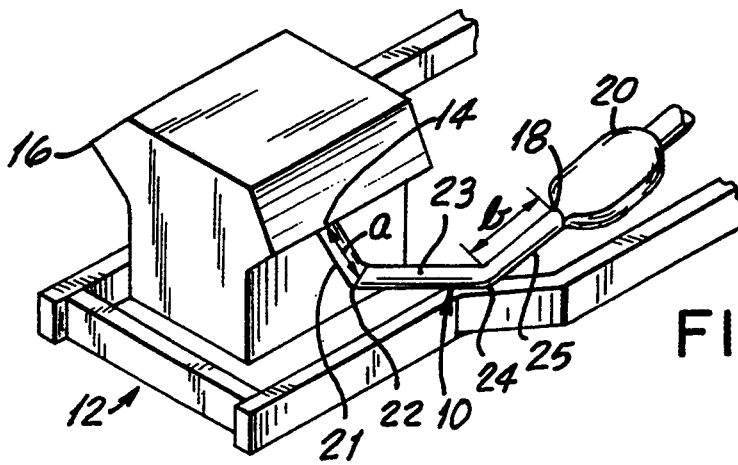
FIG. 1
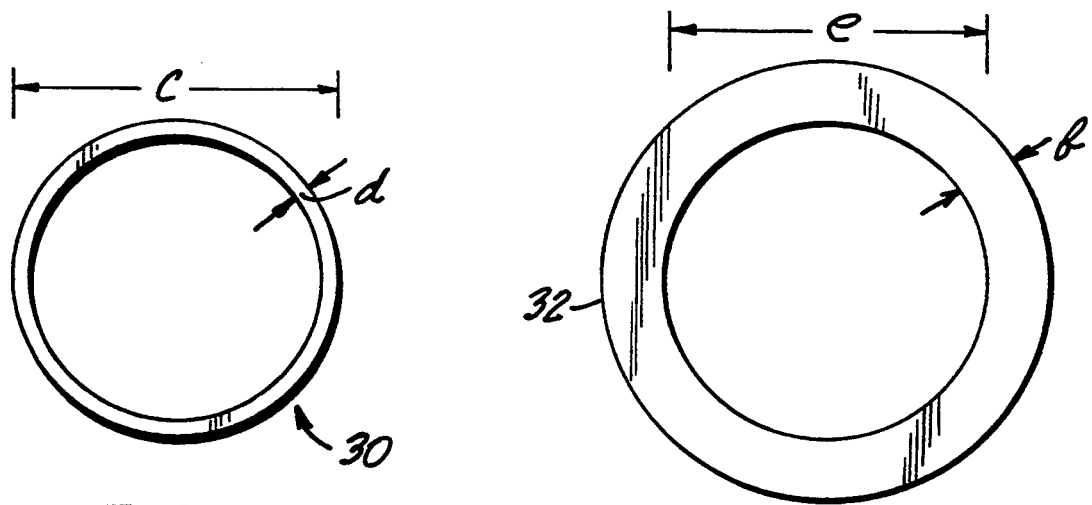
FIG. 2
FIG. 4
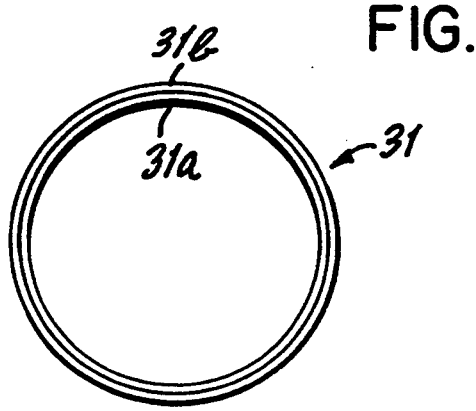
FIG. 3

PIPE ASSEMBLY FOR EFFICIENT LIGHT-OFF OF CATALYTIC CONVERTER

BACKGROUND OF THE INVENTION

Catalytic converters are used in vehicular exhaust systems to convert certain objectionable gases into environmentally more acceptable forms. The catalyst in the converter becomes operative or "lights-off" after it is heated to a specified temperature by the exhaust gases. Prior to lighting-off, the catalytic converter falls considerably short of complying with the air quality standards in most jurisdictions.

The walls of the exhaust pipe leading from the engine to the catalytic converter are cold when the vehicle is first started. These cold pipes function as heat sinks which effectively draw heat from the exhaust gases traveling therethrough, and hence retard the lighting-off of the catalytic converter. The amount of heat dissipated in the walls of the pipe between the engine and the catalytic converter is a function of the thermal mass of the pipe, which in turn is a function of the pipe length, pipe diameter, surface area and pipe thickness.

Catalytic converters typically are disposed as close as possible to the upstream end of an exhaust system where the exhaust gas is hottest. The upstream location is intended to accelerate the heating of the catalyst, and thereby achieves a quicker light-off. However, the engine compartment of a vehicle generally is too crowded to accommodate a catalytic converter and the required heat shields. Hence, the converter normally is disposed downstream of the engine compartment. Crowding in the engine compartment also requires a circuitous routing of the exhaust pipe extending from the engine manifold, through the engine compartment and to the catalytic converter. The circuitous routing of the exhaust pipe leading to the catalytic converter adds to the total length of the exhaust pipe. Thus, there is often a relatively long run of exhaust pipe between the manifold and the catalytic converter, even in instances where the catalytic converter can be placed fairly close to the engine compartment.

Thin pipes draw less heat from exhaust gas than thicker pipes in view of the lower thermal mass of the thinner pipes. However, pipes in the engine compartment are subject to almost continuous vibration and frequent shock. Thin pipes are likely to behave poorly in response to vibration and shock. Additionally, normal engine maintenance requires workers to periodically access the engine compartment with tools. Forcible contact with a large tool can deform or otherwise damage a thin-walled pipe in the engine compartment. A deformation can have a significant effect on the flowing exhaust gas. Exhaust-pipes undergo frequent thermal expansion and contraction which can exert significant stresses and strains on the thin pipe. Thus, automotive engineers are faced with competing demands of having a structurally adequate exhaust pipe and one that will enable the catalytic converter to light-off as quickly as possible.

Heated components of an exhaust system often must be shielded at certain locations. For example, shields are used under exhaust system components that are close to the ground to avoid creating fires in nearby leaves or grass. Similarly, shields often are disposed between the exhaust system and parts of the vehicle that are sensitive to high temperatures.

Many prior art heat shields are stamped from sheets of metal and are held in proximity to the exhaust system component by straps or welding. The prior art also includes air gap pipes to protectively separate the heated exhaust system component from adjacent parts of the vehicle or from combustible materials on the ground. Air gap pipes are relatively easy to manufacture for straight sections of an exhaust pipe. However, many prior art air gap pipe designs are difficult and costly to manufacture for circuitously aligned pipe sections. One costly approach for making a bent air gap pipe requires a linear inner pipe to be supported within a linear outer pipe by a filler material that has a lower melting point than either of the pipes. The linear assembly of inner and outer pipes and filler material is then bent into the required circuitous shape. The bent assembly is then heated sufficiently for the filler material to melt and be poured from the generally annular space between the inner and outer pipes. This approach is effective, but very costly and time consuming.

Another very effective air gap pipe and method of manufacture is shown in U.S. Pat. No. 4,501,302 and in U.S. Pat. No. 4,656,713 both of which are assigned to the assignee of the subject invention. The air gap pipes shown in these two prior patents are made by initially bending the inner and outer pipes into the required shape. The outer pipe is then cut longitudinally in half and is sandwiched around the comparably bent inner pipe.

Prior art air gap pipes perform their intended function as heat shields, but do not overcome the above described problems of the circuitous pipe in the engine compartment of a vehicle functioning as a heat sink which yields undesirable delays in lighting-off of a catalytic converter.

In view of the above, it is an object of the subject invention to provide an exhaust pipe assembly enabling a quicker light-off of a catalytic converter.

It is another object of the subject invention to provide a low thermal mass exhaust pipe exhibiting adequate structural integrity.

A further object of the subject invention is to provide a catalytic converter assembly with an ability to light-off quickly.

Still another object of the subject invention is to provide a method for manufacturing an exhaust pipe assembly for a catalytic converter.

An additional object of the subject invention is to provide an air gap pipe assembly with low heat transfer from the inner pipe to the outer pipe.

Yet another object of the subject invention is to provide an air gap pipe assembly that substantially avoids excessive stresses and strains in response to thermal expansion and contraction.

SUMMARY OF THE INVENTION

The subject invention is directed to an exhaust pipe assembly that is particularly effective for achieving a very quick light-off of the catalytic converter.

The pipe assembly may be complexly bent to deliver exhaust gas from the engine manifold, through the engine compartment, and to the catalytic converter. The particular circuitous shape will vary from vehicle to vehicle in accordance with the limited space available in the engine compartment, the configuration and orientation of the engine and the available space for locating and aligning the catalytic converter.

The exhaust pipe assembly of the subject invention comprises an inner pipe formed from a thin low-thermal mass material and an outer pipe formed from a much thicker material to provide structural support for the assembly. In particular, the outer pipe may be formed from a material 2-4 times thicker than the inner pipe. For example, the inner pipe of the assembly may be formed from a material having a thickness of 0.012 inch–0.020 inch. The outer pipe, on the other hand, may have a material thickness in the range of 0.042 inch–0.054 inch. The inner pipe may be a laminated pipe with a total thickness in the stated range. Laminated pipes further enhance insulation and reduce heat transfer.

The inner pipe is supported substantially concentrically in the outer pipe by a plurality of corrugations. The corrugations are formed at least at locations on the pipe assembly that are bent. Hence, the corrugations support the pipe both during the bending process and on the assembled exhaust pipe.

Corrugations can be difficult to form on conventional pipes. However, the substantially thinner-than-normal inner pipe of the subject invention can be corrugated relatively easily. Despite the relative ease of corrugation, it is preferred that the number of corrugations be minimized in accordance with the required support during bending and the required support for the assembled pipe. Minimization of corrugations reduces the total length of pipe required, and hence reduces cost, weight and thermal mass of pipe leading to the catalytic converter. Minimization of corrugations also reduces the contact area between the inner and outer pipes, and hence achieves very low heat transfer from the inner pipe to the outer pipe. Although the corrugations can be disposed only at bend locations, a small number of corrugations may be disposed on tangents leading into and out of bends and in long linear sections to reduce vibrations and to contribute to structural support. Bent areas of pipes are collapsed somewhat during bending. This collapsing of the outer pipe could crush corrugations and thereby lead to larger contact areas and greater heat transfer between the inner and outer pipes. Thus, corrugations in each bend may define smaller heights than corrugations along tangents. The height of corrugations in bends may be selected to achieve a line of contact after bending without crushing any corrugation.

The corrugations in the inner pipe preferably are configured to minimize stresses and strains in the metal of the inner pipe as the inner pipe undergoes repeated cycles of thermal expansion and contraction. Stresses and strains in the inner pipe can be substantially reduced by forming the corrugations into a substantially omega-shape.

The subject invention also is directed to a method of manufacturing a pipe assembly. The method comprises the steps of providing a linear thin-walled inner pipe and a linear thick-walled outer pipe. The inner pipe is initially deformed to include arrays of radially aligned corrugations at locations selected to coincide at least with bends on the pipe assembly and on tangents leading to and from the pipe assembly. The linear corrugated inner pipe is then inserted into the outer pipe and the two pipes are bent simultaneously. The corrugations of the inner pipe provide the support during bending and also provide support for the bent pipe assembly. The method may proceed by connecting one end of the inner pipe to a catalytic converter.

The pipe assembly of the subject invention offers several distinct advantages. First, exhaust gas traveling from the engine to the catalytic converter is exposed to only a low thermal mass material. The low-thermal mass inner pipe heats quickly, enabling more heat to be delivered quickly to the catalytic converter, and thereby enabling an early light-off of the catalyst. The outer pipe provides the necessary structural support for the assembly with a minimum contact area and a correspondingly low heat transfer. Additionally, the outer pipe provides an air insulation layer surrounding the inner pipe. As a result, heat from the thin-walled inner pipe is not dissipated to surrounding areas as quickly, and light-off time of the catalytic converter is further accelerated. The method of the subject invention also offers several manufacturing efficiencies. For example, the method of the subject invention entirely avoids the time consuming prior art approach of filling the annular space between the inner and outer pipes with a low-melting point filler prior to bending and then melting the filler from the space between pipes after bending.

BRIEF DESCRIPTION OF THE DRAWINGS

FIG. 1 is a perspective view of an exhaust system in accordance with the subject invention.

FIG. 2 is an end elevational view of an inner pipe for the subject pipe assembly prior to corrugation and bending.

FIG. 3 is an end elevational view of an alternate inner pipe.

FIG. 4 is an end elevational view of the outer pipe prior to bending.

DETAILED DESCRIPTION OF THE PREFERRED EMBODIMENT

Figure 5:
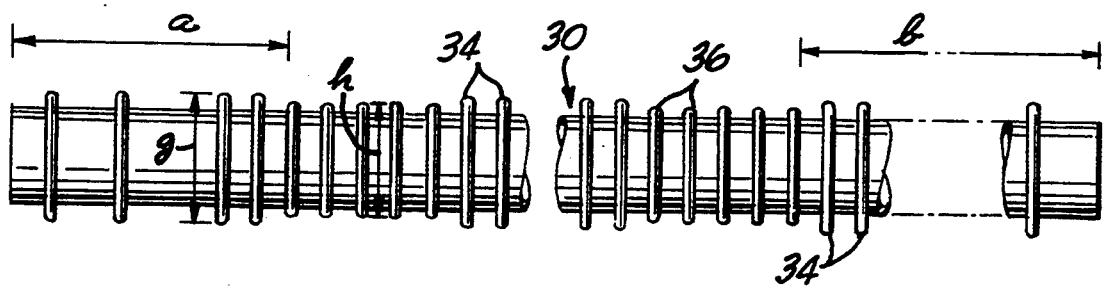
FIG. 5 is a side elevational view of the inner pipe of FIG. 2 after formation of corrugations at selected locations therein.
Figure 6:
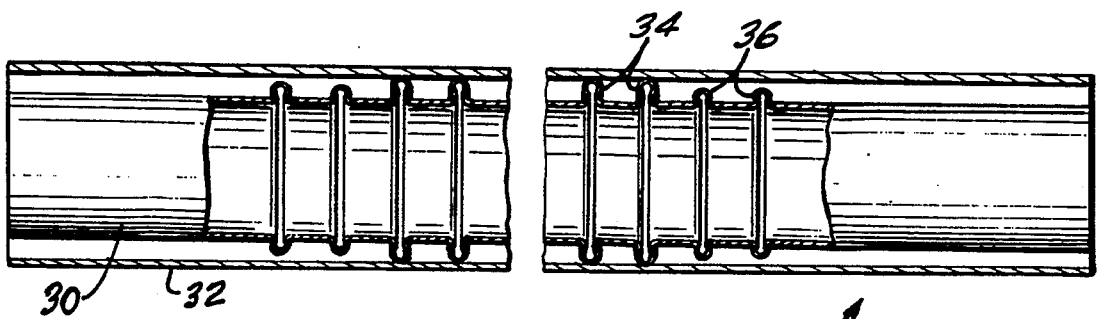
FIG. 6 is a side elevational view, partly in section, showing the assembled inner and outer pipes prior to bending.

An exhaust pipe assembly in accordance with the subject invention is identified generally by the numeral 10 in FIGS. 1 and 6. The exhaust pipe assembly 10 extends circuitously through the engine compartment of a vehicle 12, and includes an upstream end 14 connected to the engine 16 and a downstream end 18 connected to a catalytic converter 20 disposed rearwardly of the engine compartment. The circuitous alignment of exhaust pipe assembly 10 may vary significantly from vehicle to vehicle, but typically will include a plurality of bends about non-parallel axes. As shown in FIGS. 1 and 6, the exhaust pipe assembly 10 includes an upstream tangent 21 extending from the upstream end 14. An upstream bend 22 is adjacent the upstream tangent 21 and is spaced from the upstream end 14 by distance "a". An intermediate tangent 23 extends from the upstream bend 22 to a downstream bend 24. A downstream tangent 25 of length "b" extends from the downstream bend 24 to the downstream end 18 and the catalytic converter 20.

Exhaust pipe assembly 10 is operative to deliver exhaust gas from engine 16 to catalytic converter 20 prior to passage of the exhaust gas to other downstream parts of the exhaust system. The catalytic converter 20 functions to convert objectionable components of the exhaust gas into less objectionable forms. However, the catalyst in the converter 20 must be heated by the flowing exhaust gas to a predetermined temperature before it will perform properly.

With reference to FIG. 2, the exhaust pipe assembly 10 includes an inner pipe 30 for carrying the exhaust gas between the engine 16 and the catalytic converter 20. The inner pipe 30 has an outside diameter "c", which may be about 2.00 inches, and is formed from steel having a thickness "d" of between 0.012 inch and 0.020 inch. However, as shown in FIG. 3, an alternate inner pipe 31 may be formed from laminated layers 31a and 31b having a combined thickness of 0.012–0.020 inch. The laminated inner pipe 31 will provide greater thermal insulation. The thickness "d" of the inner pipe 30, 31 (0.012–0.020 inch) is only about one-fourth the thickness of a typical prior art exhaust pipe. As a result, inner pipe 30 will heat very quickly, and will not function as a heat sink that could defer the lighting-off of catalytic converter 20 after a cold start.

The thin steel from which inner pipe 30 is manufactured has the potential of being easily damaged in the harsh environment of a vehicular engine compartment. To prevent such damage, and to reduce heat dissipation due to connection in air circulating near the engine the pipe assembly 10 further includes an outer pipe 32 having an inside diameter "e", which may be about 2.75 inches. Thus, an enclosed annular air gap is defined between the inner and outer pipes to minimize heat dissipation from the inner pipe. The outer pipe 32 is formed from a steel having a material thickness "f" of 0.042–0.054 inch, as shown in FIG. 4. The greater thickness for outer pipe 32 provides structural support and protection for the thinner inner pipe 30.

As noted above, the exhaust pipe assembly 10 includes a plurality of bends 22, 24 and a corresponding plurality of tangents 21, 23 and 25 leading into or out of the respective bends 22, 24. To enable the inner and outer pipes 30 and 32 to be complexly bent and to be supported in substantially concentric relationship with one another, the inner pipe 30 is provided with arrays of tangent corrugations 34 and arrays of bend corrugations 36. The tangent corrugations 34 define an outside diameter "g" which is equal to or slightly less than the inside diameter "e" of the outer pipe 32. The tangent corrugations 34 are disposed along inner pipe 30 to align with tangents 21, 23 and 25 on the exhaust pipe assembly 10. The bend corrugations 36 on the inner pipe 30 define an outside diameter "h" which is less than the diameter "g" for the tangent corrugations. The bend corrugations 36 are disposed along the inner pipe 30 at locations that will align with bends 22 and 24 in the exhaust pipe assembly 10.

The spacing between corrugations 34, 36 will depend upon several factors, including the dimensions of the respective pipes and the amount of bending required. Corrugations 34, 36 that are too close will provide adequate support, but will provide more heat transfer than desired. Corrugations 34, 36 that are too far apart will enable a desirably low heat transfer, but may not provide adequate structural support. A preferred spacing for corrugations 34, 36 at least in regions to be bent and in tangents adjacent to the bends preferably is between 0.5 inch and 2.5 inch. Exceptional structural support and heat insulation have been observed with corrugations spaced at approximately 0.75 inch at least in regions of bends.

The inner pipe 30 is subject to repeated cycles of thermal expansion and contraction, and thus is exposed to thermal stresses and strains. To better accommodate thermally generated dimensional changes and associated structural stress, the corrugations 34, 36 preferably are formed with a generally omega-shape. The omega-shape corrugations are well suited to repeated cycles of dimensional changes.

As depicted in FIG. 6, the corrugated linearly aligned inner pipe 30 is inserted into the linear outer pipe 32. Tangent corrugations 34 will support inner pipe 30 substantially concentrically within outer pipe 32. Bend corrugations 36 are smaller than tangent corrugations 34, and hence will be spaced from outer pipe 32 prior to bending. The assembled inner and outer pipes 30 and 32 are then bent to an appropriate configuration as depicted generally in FIG. 1 and in FIG. 6. Compression bending of the pipe assembly 10 deforms the outer pipe 30 in regions of bends 22 and 24 without significantly deforming the outer pipe 32 along tangents. The deformation of the outer pipe 32 at bends 22 and 24 brings the outer pipe 32 into supporting engagement with the bend corrugations 36. More particularly, the bend corrugations 36 are dimensioned to engage outer pipe 32 after bending, without significant crushing of bend corrugations 36. In this regard, larger corrugations in areas of bends would be crushed by the bending process. Although crushing might not affect the structural integrity of the pipe assembly 10, it would significantly increase the surface area of contact, and hence would cause proportionally greater heat transfer from the inner pipe 30 to the outer pipe 32.

Figure 7:
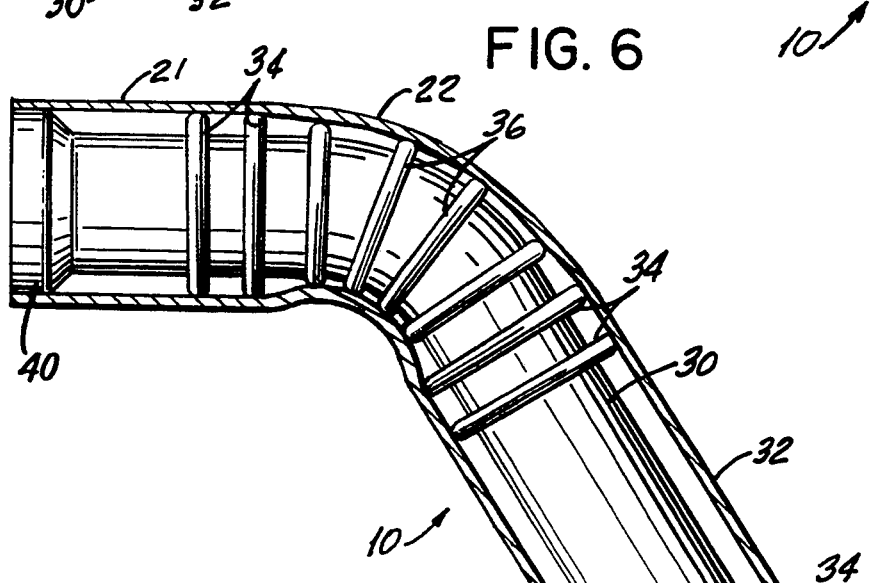
FIG. 7 is a side elevational view, partly in section showing the inner and outer pipes after bending.

The inner pipe 30 must be connected in gas-flow relationship to both the manifold of the engine and to a catalytic converter. As shown in FIG. 7, this connection can be achieved by inserting a ring 40 into the inner pipe 30 adjacent each end. The ring 40 may be spot welded in position and then is sized outwardly to achieve a force friction fit between the inner and outer pipes 30 and 32 adjacent the end. The inner and outer pipes 30 and 32 are then in contact with one another adjacent opposed ends of the pipe assembly 10 and can be securely welded to flanges or directly to the manifold or catalytic converter.

In use, the thin-walled inner pipe 30 of the exhaust pipe assembly 10 is heated quickly after a cold start, and hence does not function significantly as a heat sink for the exhaust gases traveling to catalytic converter 20. Heat dissipation through inner pipe 30 is minimized by the annular air insulation between the inner pipe 30 and the outer pipe 32 and by the very small contact area. As a result, the catalytic converter 16 lights-off quickly and achieves efficient operation during short drives following a cold start.

While the invention has been described with respect to a preferred embodiment, it is apparent that various changes can be made without departing from the scope of the invention as defined by the appended claims.

I claim:

1. An exhaust pipe assembly comprising:
   a thin-walled inner pipe having at least one bend and tangents on opposed ends of said bend, said inner pipe being formed to include corrugations through said bend defining a selected outside diameter, said inner pipe further including at least one corrugation on each said tangent in proximity to said bend, said corrugations on said tangents defining outside diameters greater than the outside diameter of said corrugations through said bend; and a thick-walled outer pipe having at least one bend and tangents on opposed ends of said bend, such that said outer pipe is disposed in surrounding relationship to said inner pipe, said tangents of said outer pipe defining an inside diameter approximately equal to the outside diameter of the corrugations on the tangents of said inner pipe, and said outer pipe being deformed in said bend to define an inside diameter approximately equal to the outside diameter defined by the corrugations through the bend of said inner pipe.

2. An exhaust pipe assembly as in claim 1, wherein the outer pipe defines a radial thickness of between 0.042–0.054 inch.

3. An exhaust pipe assembly as in claim 1, wherein the inner pipe defines a radial thickness of between 0.012–0.020 inch.

4. An exhaust pipe assembly as in claim 3, wherein said inner pipe is a laminated pipe formed from at least two laminated layers.

5. An exhaust pipe assembly as in claim 1, wherein the inner and outer pipes define radially thicknesses, the radial thickness of the outer pipe being approximately 2–4 times as great as the radial thickness of the inner pipe.

6. An exhaust pipe assembly as in claim 1, wherein the inner and outer pipes comprise a plurality of bends and a plurality of tangents extending between said bends.

7. An exhaust pipe assembly as in claim 6, wherein said inner pipe includes a plurality of corrugations on portions of said tangents extending between adjacent bends.

8. An exhaust pipe assembly as in claim 7, wherein said corrugations define a selected spacing through said bends and a selected spacing on said tangents, the spacing between corrugations on said tangents being greater than the spacing between corrugations in said bends.

9. An exhaust pipe assembly as in claim 8, wherein the spacing between corrugations through said bends is approximately 0.5 inch–0.2 inch.

10. An exhaust pipe assembly as in claim 1, wherein each said corrugation is of substantially omega-shape.

11. An exhaust pipe assembly as in claim 1, wherein said inner and outer pipes each include opposed ends, at least one of said inner and outer pipes being deformed at said ends such that said inner and outer pipes are in secure circumferential engagement with one another at said ends.

12. An exhaust system assembly comprising:
a thin-walled inner pipe having at least one bend and tangents on opposed ends of said bend, said inner pipe being formed to include corrugations in areas of said bend and corrugations in areas of said tangents, said corrugations in said areas of said bend having a selected outside diameter, said corrugations in said areas of said tangents having an outside diameter greater than the outside diameter of said corrugations through said bend;

a thick-walled outer pipe having at least one bend and tangents on opposed ends of said bend, such that said outer pipe is disposed in surrounding relationship to said inner pipe, said outer pipe having an inside diameter in areas of said bend approximately equal to the outside diameter of the corrugations on said inner pipe in said areas of send bend, said outer pipe further having an inside diameter in areas of said tangent proximally equal to the outside diameter of the corrugations on said inner pipe in said areas of said tangents, such that said corrugations support said inner pipe generally concentrating within the outer pipe without crushing said corrugations in said areas of said bend; and a catalytic converter securely mounted in fluid communication with one end of said inner pipe for receiving exhaust gas flowing therethrough, whereby the thin-walled inner pipe is heated quickly by exhaust gases for achieving a rapid light-off of the catalytic converter.

13. An exhaust pipe assembly as in claim 12, wherein the outer pipe defines a radial thickness of between 0.042–0.054 inch.

14. An exhaust pipe assembly as in claim 12, wherein the inner pipe defines a radial thickness of between 0.012–0.020 inch.

15. An exhaust pipe assembly as in claim 14, wherein said inner pipe is a laminated pipe formed from at least two laminated layers.

16. An exhaust pipe assembly as in claim 12, wherein the inner and outer pipes define radially thicknesses, the radial thickness of the outer pipe being approximately 2–4 times as great as the radial thickness of the inner pipe.

17. An exhaust pipe assembly as in claim 12, wherein said corrugations define a selected spacing through said bends and a selected spacing on said tangents, the spacing between corrugations on said tangents being greater than the spacing between corrugations in said bends.

18. An exhaust pipe assembly as in claim 12, wherein each said corrugation is of substantially omega-shape.

19. An exhaust pipe assembly as in claim 12, wherein at least one of said inner and outer pipes is deformed adjacent said catalytic converter such that said inner and outer pipes are in secure circumferential engagement with one another at said catalytic converter.

20. A method for manufacturing an exhaust pipe assembly for achieving quick light-off of a catalytic converter, said method comprising the steps of:
providing a substantially linear inner pipe formed from a thin-walled metallic material having a selected outside diameter;

providing a substantially linear outer pipe formed from a metallic material having a thickness of approximately 2–4 times greater than the thickness of the inner pipe, said outer pipe defining an inside diameter greater than the outside diameter of said inner pipe;

forming at least one array of corrugations in the inner pipe having a large outside diameter, and forming at least one array of corrugations in the inner pipe having a small outside diameter, such that the large diameter corrugations define outside diameters approximately equal to the inside diameter of said outer pipe;

inserting the inner pipe into the outer pipe to define an exhaust pipe assembly, with the inner pipe being supported generally concentrically within the outer pipe by the large diameter corrugations; and bending the assembly of the inner and outer pipes at at least one location generally aligned with the array of small diameter corrugations, such that the small diameter corrugations support the inner pipe within the outer pipe during the bending without crushing of the corrugations.

21. A method as in claim 20, further comprising the step of connecting one end of said inner pipe to a catalytic converter.

22. A method as in claim 20, wherein the step of providing an outer pipe comprises providing an outer pipe with a wall thickness of approximately 0.042–0.054 inch.

23. A method as in claim 20, wherein the step of providing an inner pipe comprises providing an inner pipe having a thickness of between 0.012–0.020 inch.

24. A method as in claim 23, wherein the step of providing an inner pipe further comprises providing a laminated inner pipe having at least two laminated layers.

25. A method as in claim 24, wherein the step of forming at least on corrugation array in the inner pipe comprises forming corrugations of substantially omega-shape.

* * * * *